United States Patent
Crowell et al.

(10) Patent No.: US 9,450,842 B2
(45) Date of Patent: *Sep. 20, 2016

(54) MONITORING HANDHELD DEVICES IN A USER TESTING MODE

(71) Applicant: Sharp Laboratories of America (SLA), Inc., Camas, WA (US)

(72) Inventors: Helen Jan Crowell, Camas, WA (US); Dane Nelson Wenzel, Gladstone, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/493,295

(22) Filed: Sep. 22, 2014

(65) Prior Publication Data

US 2015/0012650 A1     Jan. 8, 2015

Related U.S. Application Data

(63) Continuation of application No. 13/118,303, filed on May 27, 2011, now Pat. No. 8,862,723.

(51) Int. Cl.
| | |
|---|---|
| G06F 15/173 | (2006.01) |
| H04L 12/26 | (2006.01) |
| G06F 11/30 | (2006.01) |
| G06F 11/32 | (2006.01) |
| G06F 11/34 | (2006.01) |

(52) U.S. Cl.
CPC ........... *H04L 43/08* (2013.01); *G06F 11/3013* (2013.01); *G06F 11/3055* (2013.01); *G06F 11/3065* (2013.01); *G06F 11/324* (2013.01); *G06F 11/3438* (2013.01); *G06F 11/3476* (2013.01)

(58) Field of Classification Search
None
See application file for complete search history.

(56) References Cited

U.S. PATENT DOCUMENTS

| | | | | |
|---|---|---|---|---|
| 6,400,717 | B1 * | 6/2002 | Von Ahnen | G06F 9/4405 370/395.63 |
| 7,171,467 | B2 * | 1/2007 | Carley | H04L 63/08 709/224 |
| 8,850,242 | B2 * | 9/2014 | Jessup | G06F 1/3203 700/286 |
| 8,862,723 | B2 * | 10/2014 | Crowell | G06F 11/3013 709/204 |

* cited by examiner

*Primary Examiner* — John B Walsh
(74) *Attorney, Agent, or Firm* — Law Office of Gerald Maliszewski; Gerald Maliszewski

(57) ABSTRACT

A system and method are presented for monitoring handheld devices in a testing environment. At least one handheld device is provided, typically several, that is capable of performing a first plurality of functions in a non-test mode, and a more limited number of functions in a test mode. In a test environment the handheld device should be set to perform in the test mode. In the event of the handheld device mode being changed from the test mode to non-test mode, the handheld device generates a non-test mode signal. A monitoring software application records the non-test mode signal. In one aspect, the monitoring application is embedded in a remote proctor device. The remote proctor device monitoring application may send a mode interrogation message to the handheld device, and the handheld device generates the non-test mode signal in response to the mode interrogation message.

25 Claims, 6 Drawing Sheets

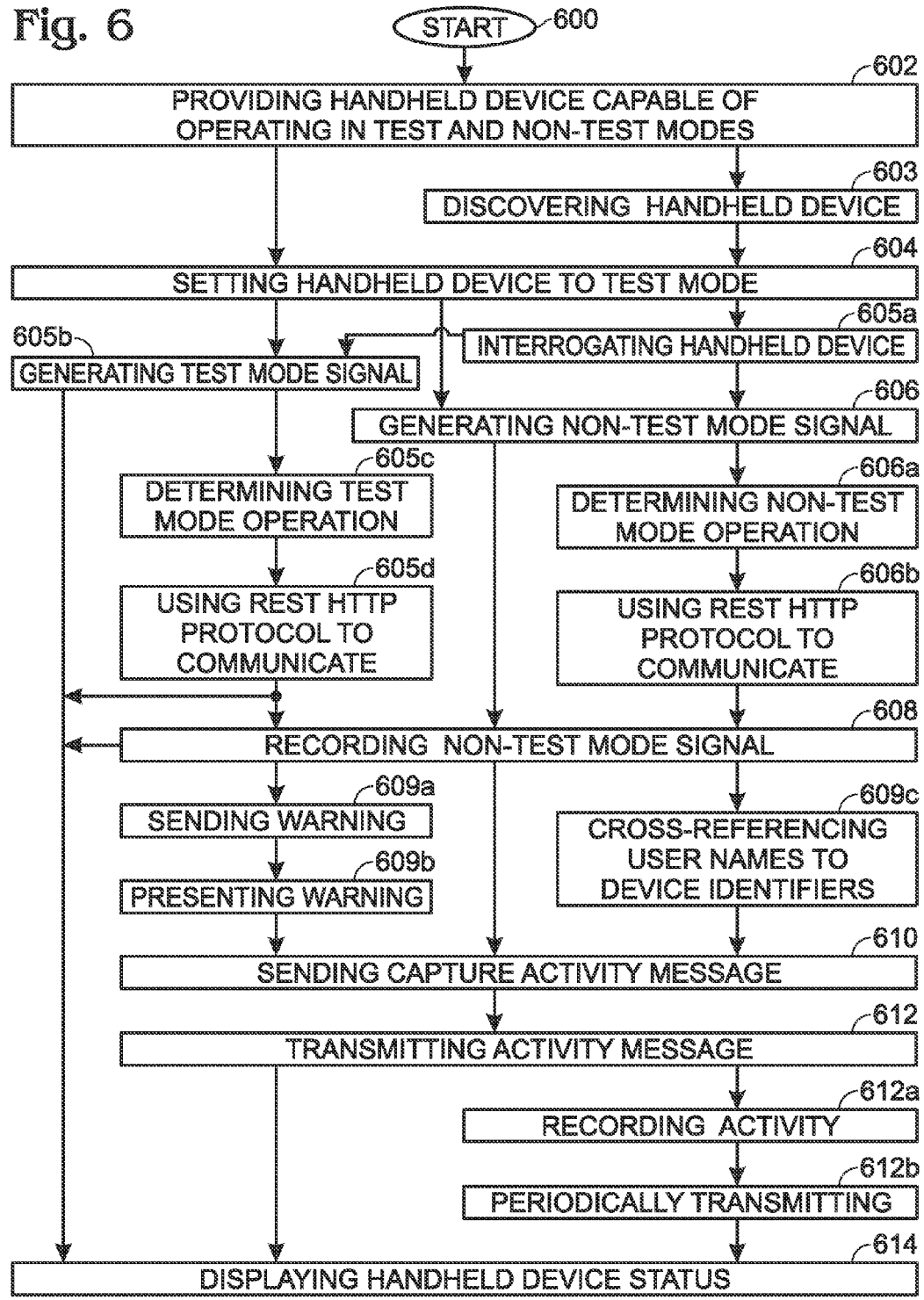

MONITORING HANDHELD DEVICES IN A USER TESTING MODE

RELATED APPLICATIONS

This application is a Continuation of an application entitled, SYSTEM AND METHOD FOR MONITORING HANDHELD DEVICES IN A USER TESTING MODE, invented by Helen Crowell et al., Ser. No. 13/118,303, filed May 27, 2011, which is incorporated herein by reference.

BACKGROUND OF THE INVENTION

1. Field of the Invention

This invention generally relates to electronic academic testing and, more particularly, to a system and method for monitoring the use of handheld devices in a classroom testing environment.

2. Description of the Related Art

Handheld devices are gaining more capabilities and features that can potentially be used by students to cheat on their exams. Currently, some handheld calculators are allowed to be used during exams if they are in "test-mode" only. Test-mode disables access to applications or programs that could aid the user in taking a test, or to files that may contain previously stored cheat notes. A flashing light-emitting device (LED) light at the top of some handheld calculators is the only indicator that the device is in the testing mode. The teacher or proctor must visually search for the flashing LED light at the top of all handheld calculators used during the exam to verify the calculators remain in the test mode.

This solution may work fine for 10 students, but for a typical class size of 40 students or a typical exam board class size of 80 students, this manual search for LED lights can be ineffective. Also, a student can distract the teacher or proctor during an exam, thus stopping all visual searches for LED lights and enabling other students to get out of test-mode to view cheat notes.

It would be advantageous if a teacher or proctor could easily monitor the use of handheld devices, enabled to operate in a limited function test mode, to prevent cheating in classroom testing environments.

SUMMARY OF THE INVENTION

Disclosed herein is a method for monitoring handheld devices which are set to operate in a limited function test mode. A proctor application periodically queries the status of all known handheld devices for test mode operation during an exam, and the handheld device notifies the proctor application when it changes mode from test-mode to normal-mode (non-test mode). The monitoring results are logged and an at-a-glance display provides real-time status for each handheld device to the teacher or proctor. When a handheld device exits out of test-mode, the teacher/proctor is alerted in real-time by updating a display with handheld device status. Exiting the test-mode may also trigger the handheld device to begin capturing usage data, such as screen shots of the handheld screen and log keystrokes, until it returns back to test-mode. This captured data can be sent to the proctor application.

Accordingly, a method is provided for monitoring handheld devices in a testing environment. At least one handheld device is assumed capable of performing a first plurality of functions in a non-test mode, and a more limited number of functions in a test mode. The handheld device is set to perform in the test mode. In the event of the handheld device mode being changed from the test mode to non-test mode, the handheld device generates a non-test mode signal. A monitoring software application records the non-test mode signal. In one aspect, the monitoring application is embedded in a remote proctor device. The remote proctor device monitoring application sends a mode interrogation message to the handheld device, and the handheld device generates the non-test mode signal in response to the mode interrogation message.

In one aspect, the remote proctor device monitoring application sends a capture activity message to the handheld device if it receives a non-test mode signal. In response, the handheld device transmits an activity message, capturing real-time handheld device user interface activity such as handheld device display screen shots and handheld device keyboard strokes.

Additional details of the above-described method and a handheld device monitoring system for use in testing environments, are provided below.

BRIEF DESCRIPTION OF THE DRAWINGS

FIG. 6 is a flowchart illustrating a method for monitoring handheld devices in a testing environment.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with monitoring a handheld device that is supposed to be operating exclusively in a test mode. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 1:
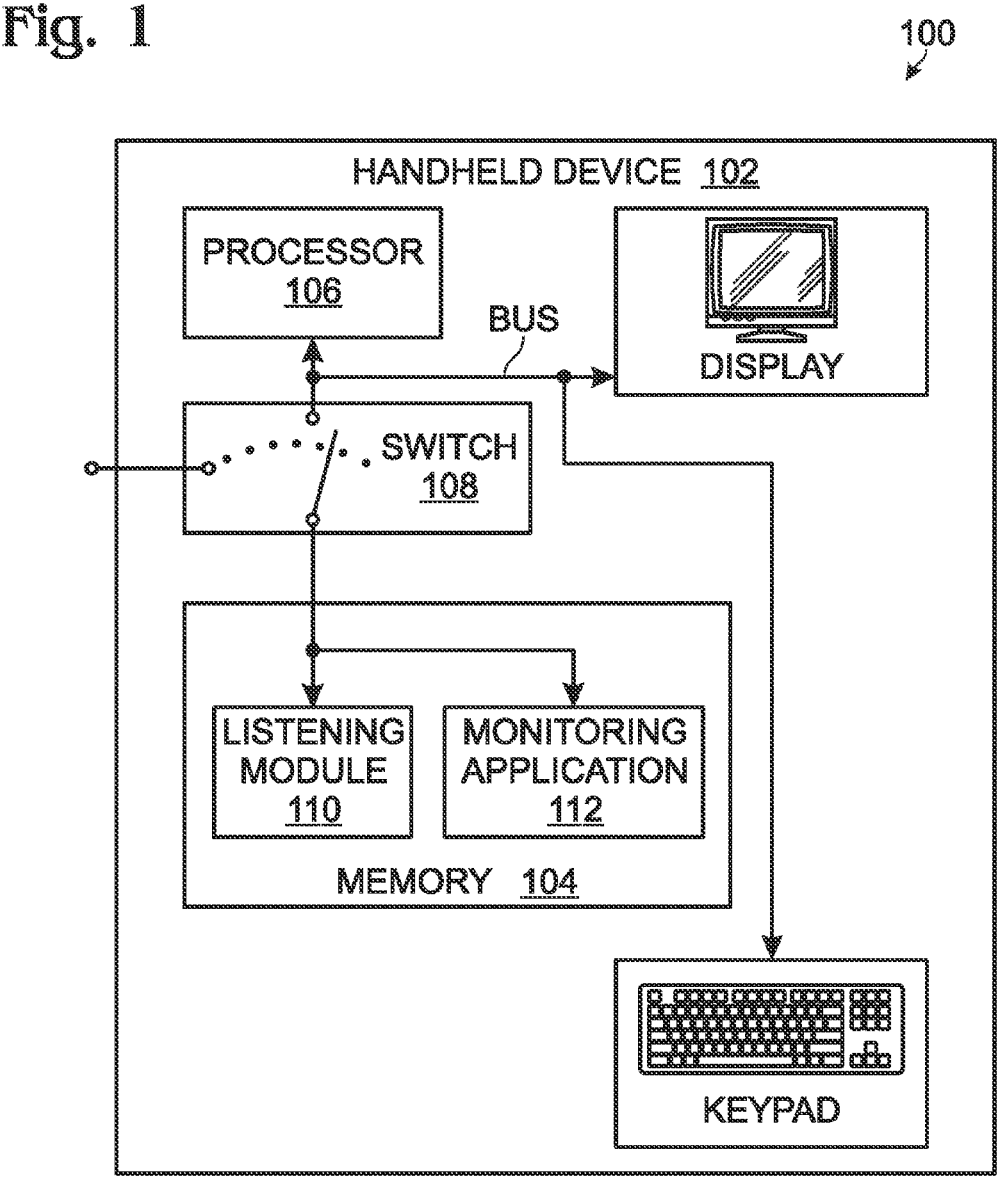
FIG. 1 is a schematic block diagram of a handheld device monitoring system for use in testing environments.

FIG. 1 is a schematic block diagram of a handheld device monitoring system for use in testing environments. The system 100 comprises a handheld device 102 with a local memory 104 and processor 106. The handheld device 102 is capable of performing a first plurality of functions in a non-test mode, and a second plurality of functions, less than the first plurality of functions, in a test mode. Some examples of a handheld device include a calculator, personal digital assistant (PDA), cell phone, smart phone, tablet, or notebook computer. A test mode switch 108 is capable of changing the mode of the handheld device. Here, the switch is depicted as a physical element. However, the switch may be software enabled from a mode switching application, or triggered from a particular sequence of keystrokes.

A listening module 110 is enabled as a sequence of software instructions stored in the handheld device local memory 104 and executed by the processor 106. The listening module generates a non-test mode signal in response to the handheld device mode being changed from the test mode to non-test mode. A monitoring application 112, enabled as a sequence of software instructions stored in local memory and executed by a processor, records the non-test mode signal. As shown in FIG. 1, the monitoring application is embedded in the handheld device 102. For example, the monitoring application 112 can be opened and examined by a proctor after a test. Alternatively, the monitoring application may be interrogated, either during or after a test, by a remote device via a hardwired or wireless interface.

Figure 2:
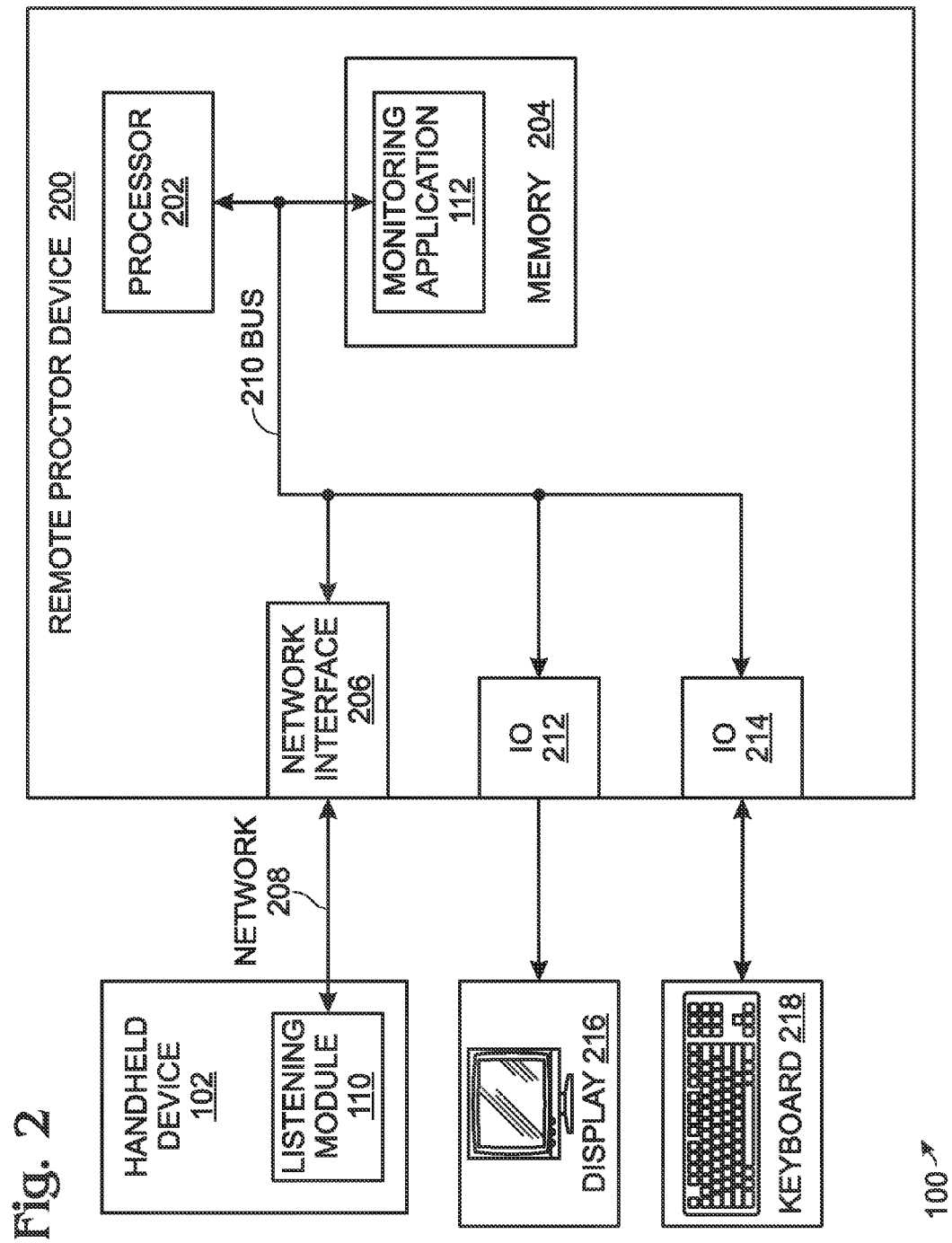
FIG. 2 is a schematic block diagram depicting a variation of the system of FIG. 1.

FIG. 2 is a schematic block diagram depicting a variation of the system of FIG. 1. In this aspect, the system 100 further comprises a remote proctor device 200, and the monitoring application 112 is embedded with the remote device. The remote proctor device 200 is a computing device including a processor 202, a memory 204, and a network interface 206 connected to a network on line 208. The monitoring application 112 is stored in the memory 204, and enabled as a software application of sequential instructions stored in the memory 204 and executed by the processor 202. Against the grain of conventional thinking, which would seek to heighten testing security by enhancing the proctor monitoring function, the system of FIGS. 1 and 2 relies upon the "cheater" to inform upon themselves by originating a non-test mode signal.

The remote proctor device 200 may be a personal computer (PC), Mac computer, tablet, workstation, server, PDA, or handheld device. The processor or central processing unit (CPU) 202 may be connected to memory 204 via an interconnect bus 210. The processor 202 may include a single microprocessor, or may contain a plurality of microprocessors for configuring the computer device as a multi-processor system. Further, each processor may be comprised of a single core or a plurality of cores. The memory 204 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 202.

The memory 204 may also comprise a mass storage with one or more magnetic disk or tape drives or optical disk drives, for storing data and instructions for use by processor 202. For a workstation PC, for example, at least one mass storage system in the form of a disk drive or tape drive, stores the operating system and application software. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the remote proctor device 200.

The remote proctor device network interface 206 may be more than one interface, shown by way of example as an interface for data communications via a network 208. The interface may be a modem, an Ethernet card, or any other appropriate data communications device such as USB. The physical communication links may be optical, wired, or wireless.

The remote proctor device 200 may further include appropriate input/output (IO) ports on lines 212 and 214 for user interface interconnection, respectively, with a display 216 and a keyboard 218. For example, the remote proctor device 200 may include a graphics subsystem to drive the output display. The output display 216 may include a cathode ray tube (CRT) display or liquid crystal display (LCD). The input control devices for such an implementation may include the keyboard for inputting alphanumeric and other key information. The input control devices on line 214 may further include a cursor control device (not shown), such as a mouse, touchpad, touchscreen, trackball, stylus, or cursor direction keys. The links to the peripherals on line 214 may be wired connections or use wireless communications.

In one aspect, the remote proctor device monitoring application 112 sends a mode interrogation message to the handheld device listening application 110. The handheld device listening application 110 generates the non-test mode signal in response to the mode interrogation message, when the handheld device is in the non-test mode. The remote proctor device monitoring application 112 may send a capture activity message to the handheld device listening application 110 in response to receiving the non-test mode signal. Then, the handheld device listening application 110 transmits an activity message, capturing real-time handheld device user interface activity such as handheld device display screen shots, handheld device keyboard strokes, or both.

For example, the remote proctor device monitoring application 112 may send a periodic capture activity message, with a period of n seconds. The handheld device listening application 110 records handheld device user interface activity, and periodically transmits the recorded handheld device user interface activity in response to the received periodic capture activity message.

In another aspect, the monitoring application 112 sends a warning message to the handheld device 102 in response to receiving the non-test mode signal, and a handheld device user interface presents a warning indicator in response to the warning message. The warning may, for example, be a text message or icon on the display of the handheld device or an auditory signal.

In addition to generating the non-test mode signal, the handheld device listener application 110 may also generate a test mode signal in response to the mode interrogation message when the handheld device is in the test mode. The remote proctor device monitoring application 112 presents handheld device test/non-test mode status on a remote proctor device display 216. For example, the display may show all handhold units operating in the test mode as a first color, and all handheld units that generated a non-test mode signal as a different color, or as a flashing icon. Upon selecting the flashing icon, the display 216 can depict real-time activity occurring at the handheld device. In one aspect, the remote proctor device monitoring application 112 receives a handheld device identifier with the non-test mode signal transmitted by the handheld device listener application 110, and cross-references user names to handheld device identifiers.

The handheld device listener application 110 may use a Representational State Transfer (REST) based HTTP protocol to communicate with the remote proctor device monitoring application 112. In one aspect, the remote proctor device monitoring application 112 uses a web services (WS) discovery application, enabled as a sequence of software instructions in local memory 204 executed by the processor 202, to connect the listener application 110 with the monitoring application 112.

Functional Description

The application monitoring the handheld devices status captures and displays the results for a teacher or proctor in real-time. The exiting of the test mode by a handheld device that is supposed to be in test mode triggers an alert on the proctor's display, and may automatically begin capturing screen shots of the handheld device's display and/or logs key strokes that are all stored for later retrieval.

Before an exam begins, all students' handheld devices should be switched to "test-mode". During this process, the student's handheld device communicates to the teacher's or proctor's monitoring application to register their handheld device, and begins sending status information. This registration identifies the student's handheld device serial number, "test-mode" status, and possibly other student information. Once all students' handheld devices are registered and in "test-mode", the exam begins and every N seconds the proctor's monitoring application queries all the handheld devices. Alternatively, the handheld devices "push" their non-test mode or test-mode status to the proctor's monitoring application. N seconds is the refresh rate of how often queries are executed and can be configured to be any positive non-zero number, for example 40 seconds. Every N seconds, the teacher's or proctor's monitoring application displays the latest results on a dashboard-like at-a-glance display of all handheld devices test-mode status. The results are captured at the refresh rate to a file for later review, if one or more handheld devices change states (exiting or entering test-mode), an alert is displayed on the proctor's display, with the handheld device serial number and possibly other information for the student. The alert(s) remain on the display until the teacher or proctor acknowledges them. The handheld device exiting the test mode can also trigger a notification from the handheld device to the proctor's application, initiating screen shots of activities on the handheld's display and log key strokes that are sent back to the proctor's monitoring application.

Figure 3:
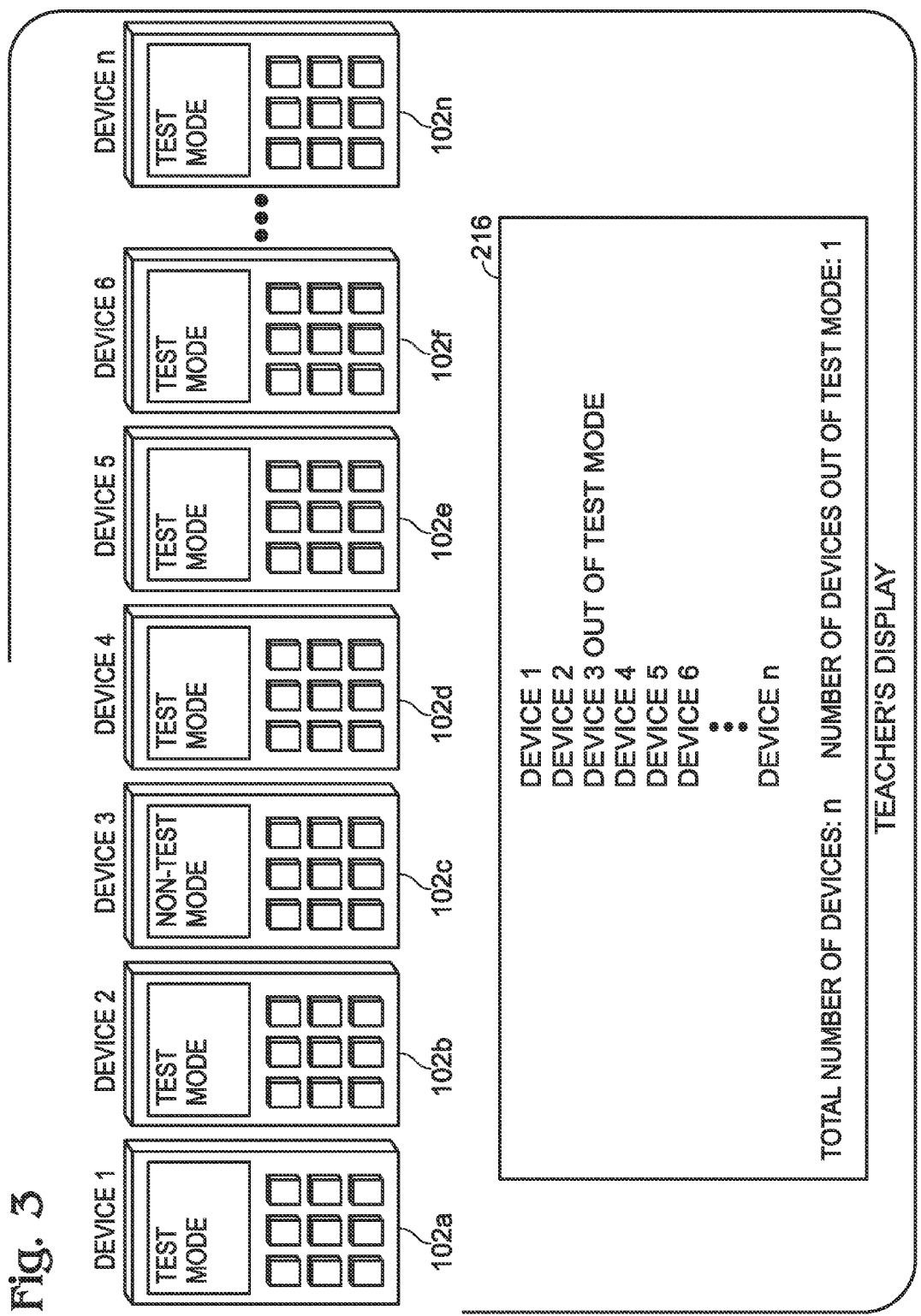
FIG. 3 is a diagram representing multiple handheld devices or calculators being used during an exam.

FIG. 3 is a diagram representing multiple handheld devices or calculators being used during an exam. The teacher's software polls all existing handheld devices test mode states and displays the results on the monitor 216 periodically. When one or more devices 102 leave the testing mode, an alert is displayed on the monitor, identifying the device(s). The results are also logged in a file for later review.

The handheld devices can communicate with the proctor's monitoring application via a wired or wireless restricted network in the exam room. The teacher's application can be software installed on a computer, laptop, or tablet device. The at-a-glance results can be presented on the display or screen type medium. The results are periodically captured based on the refresh rate and stored on the hard drive or memory device.

A web services (WS) discovery model can be used to discover and connect handheld device listening applications to the teacher monitoring application. All WS Discovery communications use multicast User Datagram Protocol (UDP) network communication protocols, using Simple Object Access Protocol (SOAP) messaging in Extensible Markup Language (XML) format.

General communication with a single handheld device may be implemented using a proprietary Hypertext Transfer Protocol (HTTP) messaging protocol to invoke Application Programming Interface (API) functions. The HTTP messaging protocol can be implemented using a separate background process, and separate port from the WS Discovery code. The teacher's monitoring application and handheld device listening application may use a REST based HTTP protocol to invoke API functions and return results. The handheld device listener application runs in the background. This application, or background service, runs constantly as long as the device is powered on. Its goal is to receive message requests from the teacher's monitoring application, and generate responses. This service needs no user interface, it is a process that runs by itself, receiving network requests, running API functions, and generating results.

The 'getStatusAPI' returns the status (test mode or normal (non-test) mode) of the handheld device to the teacher's application. This API may also include battery level and WiFi signal strength. SQLite, a software library that implements a self-contained, serverless, zero-configuration, transactional SQL database engine, may also be used.

Some of the following data may be useful in enabling communications between the handheld device and the remote proctor monitoring application:

IP Address—IP address of handheld device on WiFi network.
MAC Address Hardware address of handheld device's WiFi connection.
Serial Number—Serial number of handheld device.
Software Version—Version number of handheld device software release.
Model Name—Official model designator.

The combination of the handheld device login with student's username and password, and the device's MAC Address may be used to associate the device with a user.

Figure 4:
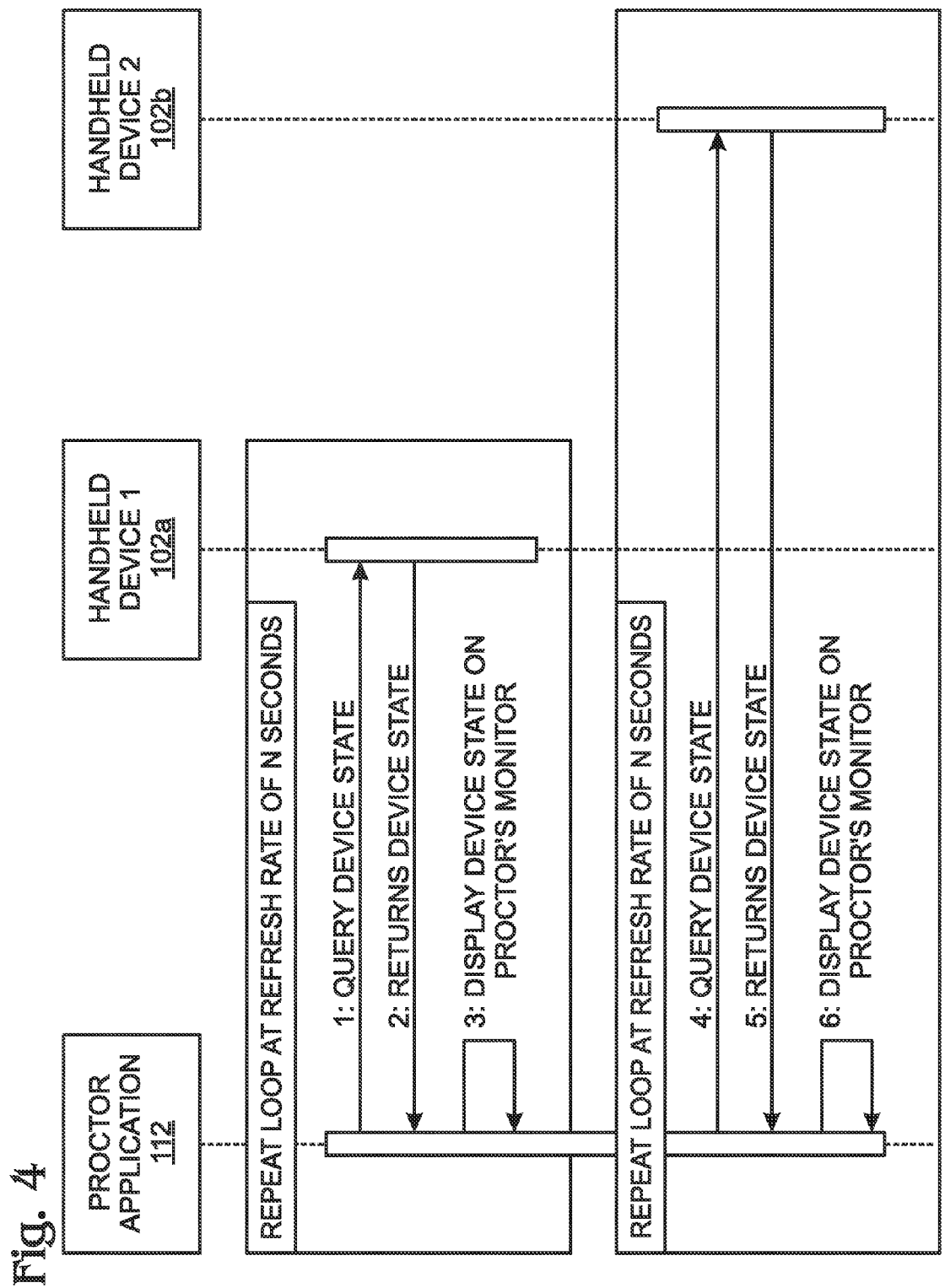
FIG. 4 is a diagram that shows the sequence of actions occurring between the proctor application and handheld devices.

FIG. 4 is a diagram that shows the sequence of actions occurring between the proctor application and handheld devices. In Step 1, the monitoring application queries a first handheld device, and an acknowledgement is returned in Step 2 with the handheld device status (test or non-test mode). In Step 3 the proctor's display is updated. This loop is repeated every N second. In Step 4 the monitoring application queries a second handheld device, and an acknowledgement is returned in Step 5. In Step 6 the proctor's display is updated. This loop is repeated every N second.

Figure 5:
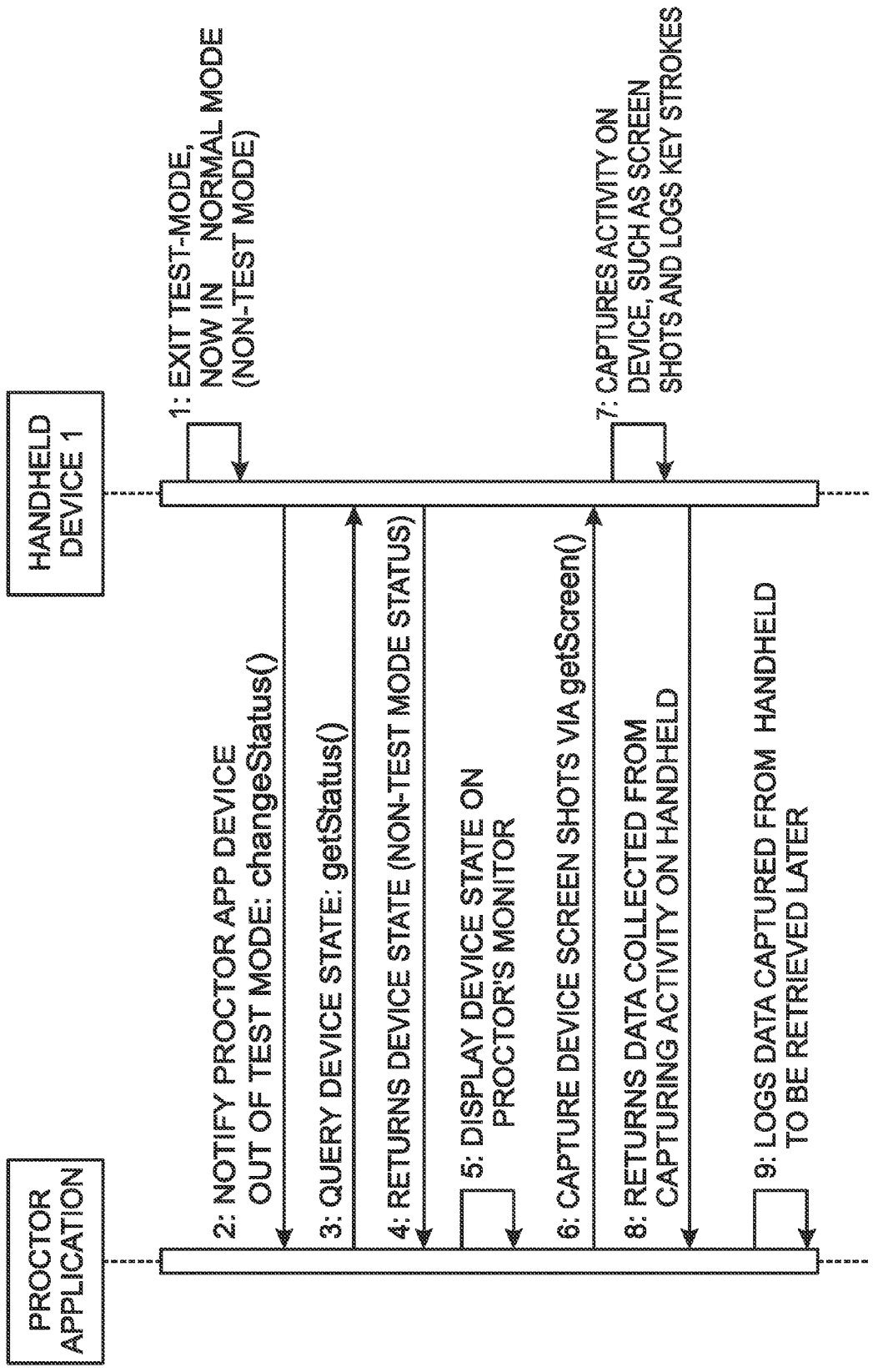
FIG. 5 is a diagram that shows the sequence of actions occurring when a handheld device exits the test-mode during an exam.

FIG. 5 is a diagram that shows the sequence of actions occurring when a handheld device exits the test-mode during an exam. In Step 1 a handheld device exits the test mode. In Step 2 the handheld device pushes a non-test mode signal to the monitoring application. Alternately, or in addition to Step 2, the monitoring applications sends a query to the handheld device in Step 3, and in Step 4 the handheld device returns an acknowledgement with the device status (device is in non-test mode). In Step 5 the proctor's display is updated. In Step 6 the monitoring application sends a request for handheld device activity, and in Step 7 the handheld device begins to capture activity such as screen shots, keystrokes, downloads, uploads, Internet access, network access, IO port use, or communication with another handheld device. In Step 8 the handheld device returns captured activity data, and in Step 9 the proctor's display updates with the captured data.

FIG. 6 is a flowchart illustrating a method for monitoring handheld devices in a testing environment. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 provides a handheld device capable of performing a first plurality of functions in a non-test mode, and a second plurality of functions, less than the first plurality of functions, in a test mode. Step 604 sets the handheld device to perform in the test mode. In the event of the handheld device mode being changed from the test mode to non-test mode, in Step 606 the handheld device generates a non-test mode signal. In Step 608 a monitoring application, enabled as a sequence of software instructions stored in local memory and executed by a processor, records the non-test mode signal. In one aspect, recording the non-test mode signal in Step 608 includes the monitoring application, embedded in the handheld device, recording the non-test mode signal. Alternatively, in Step 608 a remote proctor device embedding the monitoring application, receives the non-test mode signal from the handheld device.

In one variation, in Step 609a the monitoring application sends a warning message to the handheld device in response to receiving the non-test mode signal. In Step 609b a handheld device user interface presents a warning indicator in response to the warning message.

In one aspect, in Step 605a the remote proctor device monitoring application sends a mode interrogation message to the handheld device. Then, generating the non-test mode signal in Step 606 includes generating the non-test mode signal in response to the mode interrogation message. Alternatively, the non-test mode signal is pushed without the need for interrogation.

In another aspect, in Step 610 the remote proctor device monitoring application sends a capture activity message to the handheld device in response to receiving the non-test mode signal. In Step 612 the handheld device transmits an activity message, capturing real-time handheld device user interface activity such as handheld device display screen shots, handheld device keyboard strokes, or both. For example, the remote proctor device monitoring application sending the capture activity message in Step 610 may send a periodic capture activity message, with a period of n seconds. Then, the handheld device transmitting the activity message in Step 612 includes the following substeps. In Step 612a the handheld device records handheld device user interface activity, and in Step 612b the handheld device periodically transmits the recorded handheld device user interface activity in response to the received periodic capture activity message.

In one aspect, in Step 605b the handheld device generates a test mode signal in response to the mode interrogation message (Step 605a) if the handheld device remains in the test mode, and in Step 614 the remote proctor device monitoring application presents a handheld device test/non-test mode status on a remote proctor device display. Alternatively, the test mode signal may be pushed in Step 607 without interrogation.

In another aspect, receiving the non-test mode signal from the handheld device in Step 608 includes additionally receiving a handheld device identifier. Then, in Step 609c the remote proctor device monitoring application cross-references user names to handheld device identifiers.

In one aspect, generating the non-test mode signal in Step 606 includes a listener application, enabled as a sequence of software instructions embedded in a local memory and executed by a processor performing the following substeps. In Step 606a the handheld device determines if the handheld device is in the non-test mode, and Step 606b uses a Representational State Transfer (REST) based HTTP protocol to communicate with the remote proctor device monitoring application. In the event of the handheld device remains in the test mode (Step 605b), the handheld device listener application generates a test mode signal using the following substeps. Step 605c determines if the handheld device is in the test mode, and Step 605d uses the REST based HTTP protocol to communicate with the remote proctor device monitoring application.

In another aspect, prior the non-test mode signal being generated in Step 606, the remote proctor device monitoring application uses a web services (WS) discovery application in Step 603, enabled as a sequence of software instructions in local memory executed by the processor, to connect the handheld device listener application with the remote proctor device monitoring application.

A system and method have been provided for monitoring handheld devices in a testing environment. Examples of particular message structures, hardware units, and process flows have been presented to illustrate the invention. However, the invention is not limited to merely these examples. Other variations and embodiments of the invention will occur to those skilled in the art.

We claim:

1. A method for monitoring handheld devices in a testing environment, the method comprising:

providing a handheld device capable of performing a first plurality of functions in a non-test mode, and a second plurality of functions, less than the first plurality of functions, in a test mode;

setting the handheld device to perform in the test mode;

in the event of the handheld device mode being changed from the test mode to non-test mode, the handheld device generating a non-test mode signal; and, a monitoring application, enabled as a sequence of software instructions stored in local memory and executed by a processor, recording the non-test mode signal.

2. The method of claim 1 wherein the monitoring application is embedded in a local memory of the handheld device.

3. The method of claim 1 wherein the monitoring application is embedded in a local memory of a remote proctor device.

4. The method of claim 3 further comprising:

the remote proctor device monitoring application sending a mode interrogation message to the handheld device; and, wherein generating the non-test mode signal includes generating the non-test mode signal in response to the mode interrogation message.

5. The method of claim 3 further comprising:

in response to receiving the non-test mode signal, the remote proctor device monitoring application sending a capture activity message to the handheld device; and, the handheld device transmitting an activity message, capturing real-time handheld device user interface activity selected from a group consisting of handheld device display screen shots and handheld device keyboard strokes.

6. The method of claim 5 wherein the remote proctor device monitoring application sending the capture activity message includes the remote proctor device monitoring application sending a periodic capture activity message, with a period of n seconds; and, wherein the handheld device transmitting the activity message includes:

the handheld device recording handheld device user interface activity; and, the handheld device periodically transmitting the recorded handheld device user interface activity in response to the received periodic capture activity message.

7. The method of claim 4 further comprising:

in the event of the handheld device remaining in the test mode, the handheld device generating a test mode signal in response to the mode interrogation message; and, the remote proctor device monitoring application presenting a handheld device test/non-test mode status on a remote proctor device display.

8. The method of claim 3 wherein receiving the non-test mode signal from the handheld device includes additionally receiving a handheld device identifier; and, the method further comprising:

the remote proctor device monitoring application cross-referencing user names to handheld device identifiers.

9. The method of claim 3 wherein handheld device generating the non-test mode signal includes a listener application, enabled as a sequence of software instructions embedded in a local memory and executed by a processor:

determining if the handheld device is in the non-test mode;

using a Representational State Transfer (REST) based HTTP protocol to communicate with the remote proctor device monitoring application;

in the event of the handheld device remaining in the test mode, the handheld device listener application generating a test mode signal as follows:

determining if the handheld device is in the test mode; and, using the REST based HTTP protocol to communicate with the remote proctor device monitoring application.

10. The method of claim 9 further comprising:

prior the non-test mode signal being generated, the remote proctor device monitoring application using a web services (WS) discovery application, enabled as a sequence of software instructions in local memory executed by the processor, to connect the handheld device listener application with the remote proctor device monitoring application.

11. The method of claim 1 further comprising:

the monitoring application sending a warning message to the handheld device in response to receiving the non-test mode signal; and, a handheld device user interface presenting a warning indicator in response to the warning message.

12. A handheld device monitoring system for use in testing environments, the system comprising:

a handheld device with a local memory and processor capable of performing a first plurality of functions in a non-test mode, and a second plurality of functions, less than the first plurality of functions, in a test mode;

a test mode switch, capable of changing the mode of the handheld device;

a listening module, enabled as a sequence of software instructions stored in the handheld device local memory and executed by the processor, generating a non-test mode signal in response to the handheld device mode being changed from the test mode to non-test mode; and, a monitoring application, enabled as a sequence of software instructions stored in local memory and executed by a processor, recording the non-test mode signal.

13. The system of claim 12 wherein the monitoring application is embedded in the handheld device.

14. The system of claim 12 further comprising:

a remote proctor device; and, wherein the monitoring application is embedded with the remote device.

15. The system of claim 14 wherein the remote proctor device monitoring application sends a mode interrogation message to the handheld device listening application; and, wherein the handheld device listening application generates the non-test mode signal in response to the mode interrogation message.

16. The system of claim 14 wherein the remote proctor device monitoring application sends a capture activity message to the handheld device listening application in response to receiving the non-test mode signal; and, wherein the handheld device listening application transmits an activity message, capturing real-time handheld device user interface activity selected from a group consisting of handheld device display screen shots and handheld device keyboard strokes.

17. The system of claim 16 wherein the remote proctor device monitoring application sends a periodic capture activity message, with a period of n seconds; and, wherein the handheld device listening application records handheld device user interface activity, and periodically transmits the recorded handheld device user interface activity in response to the received periodic capture activity message.

18. The system of claim 15 wherein the handheld device listener application generates a test mode signal in response to the mode interrogation message when the handheld device is in the test mode; and, wherein the remote proctor device monitoring application presents handheld device test/non-test mode status on a remote proctor device display.

19. The system of claim 14 wherein the remote proctor device monitoring application receives a handheld device identifier with the non-test mode signal transmitted by the handheld device listener application, and cross-references user names to handheld device identifiers.

20. The system of claim 14 wherein the handheld device listener application uses a Representational State Transfer (REST) based HTTP protocol to communicate with the remote proctor device monitoring application.

21. The system of claim 20 wherein the remote proctor device monitoring application uses a web services (WS) discovery application, enabled as a sequence of software instructions in local memory executed by the processor, to connect the listener application with the monitoring application.

22. The system of claim 12 wherein the monitoring application sending a warning message to the handheld device in response to receiving the non-test mode signal; and, wherein a handheld device user interface presents a warning indicator in response to the warning message.

23. A handheld device for use in a monitored testing environment, the handheld device comprising:

a local non-transitory memory;

a processor capable, but not permitted to perform a first function when the handheld device is configured to a non-permitted mode of operation, and permitted to perform the first function when the handheld device is configured to a permitted mode of operation;

a user-interface mode switch, capable of enabling the first function in response to user commands;

a listening module, enabled as a sequence of software instructions stored in the local memory and executed by the processor, generating a warning signal in response to the first function being enabled when the handheld device is configured to the non-permitted mode of operation; and, a monitoring application, enabled as a sequence of software instructions stored in the local memory and executed by a processor, recording the listening module generating the warning signal.

24. The handheld device of claim 23 wherein the monitoring application receives a mode interrogation message from a source device external to the handheld device, and transmits the warning signal to the source device.

25. The handheld device of claim 23 wherein the monitoring application transmits the warning signal to a destination device external to the handheld device.

* * * * *